Dec. 29, 1970     L. L. HUFFMAN     3,550,335
SKYLIGHT JOINT CONSTRUCTION
Filed Feb. 10, 1969
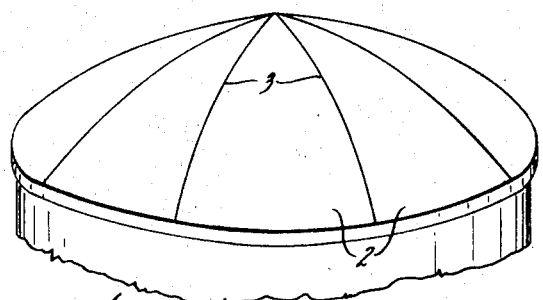
FIG_1
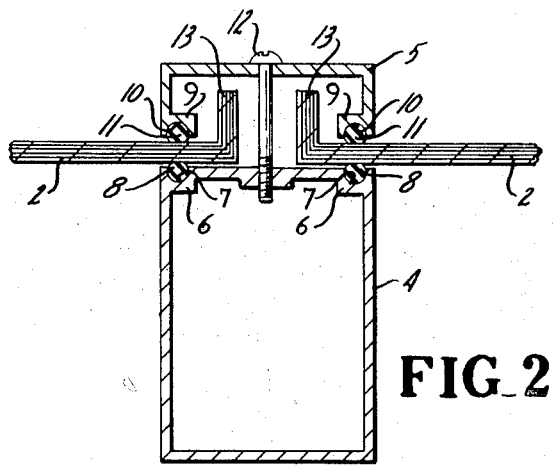
FIG_2
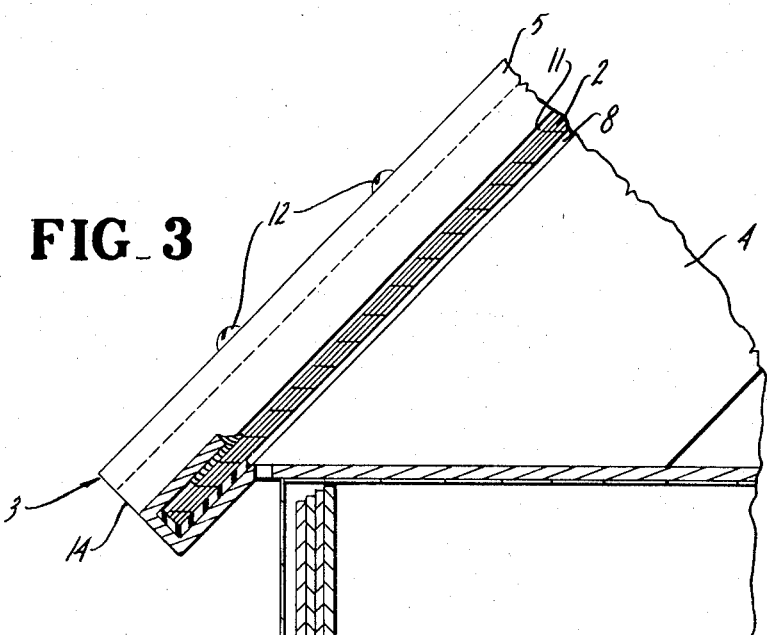
FIG_3
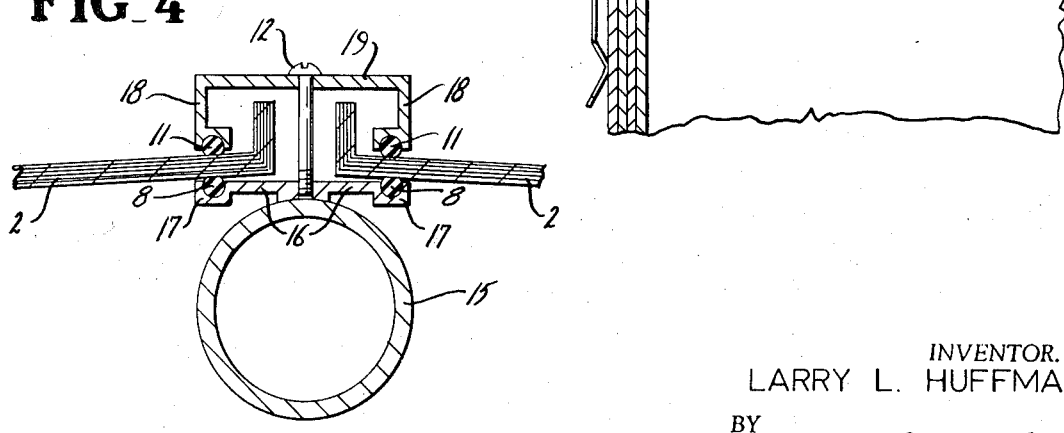
FIG_4
INVENTOR.
LARRY L. HUFFMAN
BY
Attorneys

3,550,335
SKYLIGHT JOINT CONSTRUCTION
Larry L. Huffman, Thiensville, Wis., assignor to Super Sky Products, Inc., Thiensville, Wis., a corporation of Wisconsin
Filed Feb. 10, 1969, Ser. No. 797,869
Int. Cl. E04b 7/04
U.S. Cl. 52—82                                    3 Claims

ABSTRACT OF THE DISCLOSURE

This invention is directed to a joint construction for skylights in which the glazing panels are of acrylic resin. In order to control the expansion and contraction of the acrylic resin panels, the panels are clamped at their joints between rods of plastic, which are confined in opposed relation in a rafter body and cap respectively and can rotate or permit easy noiseless movement of the panels therein under any tendency of the panels to expand or contract. In addition, the inner ends of the panels at the area inside the joint have upstanding flanges to prevent the panels from working out of the joints and to trap any water which might pass into the joint.

SUMMARY OF THE INVENTION

In general, the invention is directed to a joint construction for skylights in which the the glazing panels of the skylight are made of a plastic light transmitting material which tends to expand and contract under different temperature conditions in service. One such plastic material is made of acrylic resin and it has been found that panels of acrylic resin tend to expand and contract 1/16" per foot. This creates numerous problems in connection with leakage. However, it is desirable to use acrylic panels in skylights of curved construction and also acrylic panels are available in much larger sizes than glass. Under the construction of the invention, it is possible to mechanically maintain skylights water tight at the joints between panels without resorting to gaskets or sealants as has been the practice in the prior art.

The construction of the joint of the invention is directed to a rafter formed of a body section and cap section which are bolted together. Each inner face of the two sections at their respective outer edges are enlarged at that area and are provided with grooves. Confined in each groove are roller-like members or rods of plastic. Panels of acrylic resin or like plastic material which are to be joined by the rafter extend between the rods and into the inside of the rafter. The inner end of each panel has an upstanding flange so that when the panels are clamped between the rafter sections by securing the cap to the body section of the rafter the flange on each panel prevents the panel from moving out of the joint under any tendency to expand or contract. The plastic rods permit noiseless expansion and contraction of the panels without injury to the panels. The flanges besides retaining the panels inside the joint trap any water passing between the rods into the inside of the joint which is then drained down the panels at the flange area to the lower curb of the skylight where it is drained out to the exterior of the joint.

In the drawings:

FIG. 1 is a perspective view of an example of a skylight to which the joint construction of the invention may be applied;

FIG. 2 is a horizontal transverse section through one of the rafters or joints of the skylight of FIG. 1; and FIG. 3 is a fragmentary sectional view of the joint in FIG. 1 at the lower end to illustrate water drainage; and FIG. 4 is a horizontal transverse section through a joint to illustrate another embodiment of the invention.

Referring to the drawings, there is shown in FIG. 1 a skylight 1 formed of a plurality of glazing panels 2 which are secured together at joints 3. The respective panels 2 are of a light transmitting plastic material such as of acrylic resin which tends to expand and contract in service under different temperature conditions.

The joint 3 for receiving adjoining panels 2 is provided by a rafter, formed of a rectangular shaped body section 4 and a cap section 5.

The inner face of body section 4 adjacent each side of the section is provided with an enlarged abutment 6 in which is formed a groove 7 which receives a roller-like member or rod 8. Each rod 8 is made of plastic material such as delrin or polypropylene and is press fitted into its respective groove in abutment 6. The grooves 7 are of such depth that the wall of the grooves extend beyond one-half of the body of each rod 8 so that the rods 8 are retained in their respective grooves when located in place. However, the fit of rods 8 in their respective grooves 7 permits them to rotate when the panels move.

Similarly, the inner face of each leg of the cap section 5 of the rafter is provided with an abutment 9 to provide for a groove 10 therein. A rod 11 corresponding to rods 8 in body section 4 is confined within each groove 10 and the rods 11 are also free to rotate within their respective grooves. Each rod 11 is located in opposed relation to a rod 8.

The panels 2 extend between the respective opposed rods 8 and 11 of the body section 4 and cap section 5 of the rafter and are clamped between the rods when bolt 12 is threaded home in body section 4 to secure the body 4 and cap 5 together. The bolt 12 is tightened sufficiently to engage the rods 8 and 11 with the surfaces of the panels 2 in clamping relation, but leaves the panels 2 sufficiently free to move between opposing rods 8 and 11 when the panels tend to expand or contract.

The inner end of each panel 2 is provided with an upstanding flange 13 to insure the panels will not run out of the joint and also to trap any water which may tend to pass between the panels 2 and rod 11 to the inside of the rafter. In the event that water is trapped, it flows downwardly in the crevice between each flange 13 and its respective panel 2 and out the open end 14 of cap 5 shown in FIG. 3.

If there is any tendency of the glazing panels 2 to expand or contract, they can slide between the respective rods 8 and 11 and in some cases the rods will rotate as the panels move. The movement of the panels is noiseless as the rods are of a compatible material.

Referring to FIG. 4, the construction shown there of the joint of the invention is the same as described with respect to FIG. 1 except that the rafter body 15 is circular or tubular. In order to accommodate the rods 8, the inner face of the body 15 of the rafter is provided with the horizontal extrusion 16 which has abutments 17 at each end with grooves therein to receive rods 8 in opposed relation to respective rods 11 confined in abutments in the inner face of the legs 18 of cap 19. The cap and body of the rafter are secured together by a bolt 12 the same as is the rafter shown in FIG. 2.

In assembling the joint 3 and the panels 2 which will be described with respect to FIG. 1, the rods 8 are press-fitted into their respective grooves 7 which have been provided in abutments 6 of body section 4. Similarly, rods 11 are press-fitted into their respective grooves 10 which have been provided in abutments 9 in each leg of cap section 5. The ends of the panels 2 are assembled over body section 4 of the rafter and rest on rods 8. The cap 3 is then laid over the panels 2 with each rod 11 vertically aligned with a rod 8, and the cap 3 is secured to a body section 4 by threading bolt 12 which extends through the top of cap 3 into the body section 4 of the rafter. The bolt 12 extends between the respective flanges 13 of panels 2.

The joint of the invention is readily assembled and provides a water tight construction of a skylight joint without the use of gaskets or sealants. Furthermore, the plastic panels of the skylight are free to expand and contract without cracking or causing leakage.

I claim:

1. In a joint construction for a skylight, a plurality of glazing panels of light-transmitting plastic material tending to expand and contract under changing weather conditions, a rafter provided of two sections adapted to join two of said panels together with the ends of the sections facing each other and lying in substantially the same plane, a plastic roller-like member confined in a fixed position adjacent each of the outer ends of the one section and a corresponding roller-like member confined in a fixed position adjacent each outer end of the opposite section with said panels passing between the roller-like members to the inside of the rafter, the said roller-like members permitting contraction and expansion of the panels under changing weather conditions, means to secure the sections of the rafter together to secure the panels between the roller-like members and the rafter sections under sufficient pressure to hold the panels in place but permitting the panels to pass between the rollers under contraction and expansion of the panels, and means to retain the panels within said rafter.

2. The joint construction of claim 1, in which the glazing panels are of acrylic resin, and the roller-like members are rods of a plastic material compatible with the panels, and said rods are confined within grooves in the respective facing ends of the rafter, the said rods being capable of rotating within said grooves under any tendency of the panels to expand or contract, the combination of the plastic rods and acrylic panels providing for noiseless movement of the panels at the joint area as the panels expand and contract.

3. The joint construction of claim 2, in which the means to retain the panels in the rafter comprises upstanding flanges at the inner ends of the glazing panels to prevent the panels from running out of the rafter when the panels tend to expand.

References Cited

UNITED STATES PATENTS

| | | | |
|---|---|---|---|
| 1,209,378 | 12/1916 | Barks | 52—459X |
| 1,274,773 | 8/1918 | Plym | 52—282 |
| 2,151,234 | 3/1939 | Rutten et al. | 52—461X |
| 3,210,808 | 10/1965 | Creager | 52—282 |
| 3,266,207 | 8/1966 | Birum, Jr. | 52—459 |
| 3,325,951 | 6/1967 | Johnston | 52—200X |
| 3,367,077 | 2/1968 | Johnston | 52—397X |
| 3,376,676 | 4/1968 | Tatevossian | 52—463X |

FRANK L. ABBOTT, Primary Examiner

S. D. BURKE, Assistant Examiner

U.S. Cl. X.R.

52—90, 200, 282, 309, 573